Feb. 9, 1932.  W. J. AUSTIN  1,844,739
ANIMAL TRAP
Filed June 10, 1929
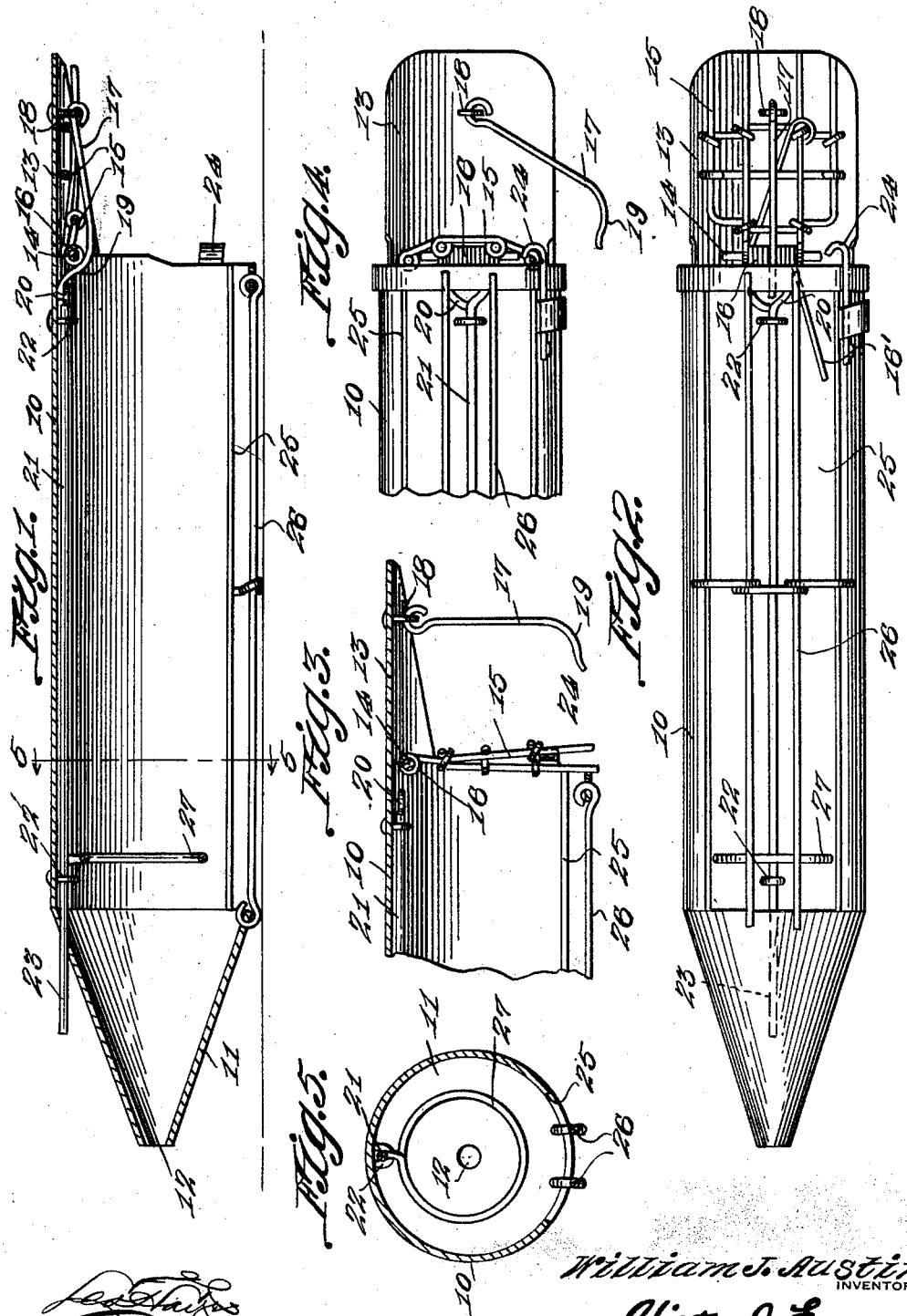
William J. Austin, INVENTOR
BY Victor J. Evans, ATTORNEY Patented Feb. 9, 1932

1,844,739

UNITED STATES PATENT OFFICE

WILLIAM J. AUSTIN, OF COUNCIL BLUFFS, IOWA

ANIMAL TRAP

Application filed June 10, 1929. Serial No. 369,825.

This invention relates to animal traps especially designed for trapping gophers, an object being to provide means whereby gophers and other animals may be captured in a humane manner.

Another object of the invention is the provision of a trap of novel wall construction, having a spring influenced door with means to protect the door when the trap is "set", so that an animal or object will not accidentally contact with the door and spring the trap before the animal enters.

Another object of the invention is the provision of a trap which includes novel and positive means for springing the trap only after an animal enters.

With the above and other objects in view the invention further includes the following novel features and details of construction, to be hereinafter more fully described, illustrated in the accompanying drawings and pointed out in the appended claim.

In the drawings:—

Figure 1 is a longitudinal sectional view of an animal trap constructed in accordance with the invention.

Figure 2 is a bottom plan view.

Figure 3 is a fragmentary sectional view showing one end of the trap after the trap has been sprung.

Figure 4 is a bottom plan view with the parts in the position shown in Figure 3.

Figure 5 is a sectional view on the line 5—5 of Figure 1.

Referring to the drawings in detail wherein like characters of reference denote corresponding parts, the reference character 10 indicates the casing of the trap which is cylindrical in shape and tapers at one end into conical formation as shown at 11 with an opening 12 at the extremity of this end. The other end of the casing is open and extending from this end outward over the opening is a canopy 13.

Pivotally secured upon the rod 14 at the inner end of the canopy 13 is a grate-like door or closure 15. A spring 16 which is mounted upon the rod 14 has one of its ends secured to the door or closure 15 and its opposite end secured to the inside of the casing as indicated at 16' so that the tension of the spring will be exerted to hold the door in closed position.

For the purpose of holding the door open, there is provided a trigger 17. One end of this trigger is pivotally secured to the canopy 13 as shown at 18, while its opposite end is bent as indicated at 19. The trigger is designed to engage beneath the door when the latter is open or in the position shown in Figures 1 and 2 of the drawings, and the inner bent end of the trigger is adapted for removable engagement with a flat relatively wide loop 20 which is formed at the inner end of a rod 21. This rod is mounted for longitudinal sliding movement in eyes 22 which are carried at the top of the casing and the opposite end of the rod extends through the casing as shown at 23 so as to provide a handle by means of which the rod may be easily manipulated.

A spring hook 24 is secured to one side of the casing in the path of one of the bars of the door 15, so that when the latter is closed the hook will engage this bar and prevent the door from being forced open.

The casing is preferably provided with an open bottom as indicated at 25 and this bottom is closed by a grate-like structure 26.

The trap may be set by raising the door 15 and extending the trigger 17 beneath the door so that the inner end of the trigger will engage the adjacent end or loop 20 of the rod 21. The latter may be slid longitudinally for this purpose by means of the extended end or handle 23.

A suitable bait may be placed in the trap if desired and an animal entering the trap will engage a ring 27 which is rigid with and depends from the rod 21. The rod will thus be slid longitudinally to release the end of the trigger 17, whereupon the door will be released and will spring to a closed position, in which position it will be held by the latch 24.

The extended portion or canopy 13 acts to protect the door when the trap is set so that the trap will not accidentally be sprung by an object falling upon the trap. Further, the door will be so postioned as to be out of the path of an animal entering the trap so that the trap will not be sprung until the animal is safely inside.

The invention is susceptible of various changes in its form, proportions and minor details of construction and the right is herein reserved to make such changes as properly fall within the scope of the appended claim.

Having described the invention what is claimed is:—

In an animal trap, an elongated casing having an opening in one end, a spring influenced door for said opening, a trigger for engagement with the door to hold the latter in open position, a rod mounted for sliding movement longitudinally within the casing and having one end extended to provide a handle, means at the other end of the rod for detachable engagement with the trigger to hold the latter in door engaging position, and means within the casing for engagement by an animal entering the trap to slide the rod and release the trigger.

In testimony whereof I affix my signature.

WILLIAM J. AUSTIN.